(12) United States Patent
Chang

(10) Patent No.: US 11,370,884 B2
(45) Date of Patent: Jun. 28, 2022

(54) COMPOSITE TEXTILE PRODUCT

(71) Applicant: YIE-CHENG TEXTILE TECHNOLOGY CO., LTD., Taoyuan (TW)

(72) Inventor: Chih-Yu Chang, Taoyuan (TW)

(73) Assignee: YIE-CHENG TEXTILE TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 17/152,310

(22) Filed: Jan. 19, 2021

(65) Prior Publication Data
US 2021/0139648 A1    May 13, 2021

Related U.S. Application Data

(63) Continuation-in-part of application No. 16/004,899, filed on Jun. 11, 2018, now abandoned.

(30) Foreign Application Priority Data

Oct. 3, 2017   (TW) .................................. 106134238

(51) Int. Cl.
*B32B 27/12* (2006.01)
*B32B 27/34* (2006.01)
(Continued)

(52) U.S. Cl.
CPC ................ *C08G 69/40* (2013.01); *B32B 7/12* (2013.01); *B32B 27/06* (2013.01); *B32B 27/12* (2013.01);
(Continued)

(58) Field of Classification Search
CPC ......... C08G 69/40; B32B 27/12; B32B 27/34; B32B 27/06; B32B 7/12; B32B 2262/0261; B32B 2307/726; B32B 2250/24; B32B 2272/00; B32B 5/26; B32B 5/022; B32B 2250/20; B32B 2307/732; B32B 2571/00; B32B 2250/02; B32B 2250/03; B32B 2307/51; B32B 2307/552;
(Continued)

(56) References Cited

U.S. PATENT DOCUMENTS 4,242,464 A   12/1980   Boutle
4,847,142 A   7/1989   Twilley et al.
(Continued)

FOREIGN PATENT DOCUMENTS

CN    1723235 A    1/2006
CN    101432478 A    5/2009
(Continued)

*Primary Examiner* — John D Freeman
(74) *Attorney, Agent, or Firm* — Muncy, Geissler, Olds & Lowe, P.C.

(57) ABSTRACT

A composite textile product includes a polyamide textile layer and a polyamide film. The polyamide film is bonded to the polyamide textile layer. A thickness of the polyamide textile layer is between 0.1 mm and 0.3 mm. The polyamide film has an average pore size ranging from 10 μm to 150 μm. A thickness of the polyamide film is between 0.01 mm and 0.1 mm. Wherein the polyamide film comprises a copolymer material, and the copolymer material includes a polyamide section and a polyether section.

12 Claims, 5 Drawing Sheets

(51) Int. Cl.
*B32B 7/12* (2006.01)
*C08G 69/40* (2006.01)
*B32B 27/06* (2006.01)

(52) U.S. Cl.
CPC .......... *B32B 27/34* (2013.01); *B32B 2250/24* (2013.01); *B32B 2262/0261* (2013.01); *B32B 2307/726* (2013.01); *Y10T 428/31728* (2015.04)

(58) Field of Classification Search
CPC ........ B32B 2307/554; B32B 2307/724; B32B 2307/7265; B32B 2437/00; B32B 27/285; B32B 5/02; Y10T 428/31728
See application file for complete search history.

(56) References Cited

U.S. PATENT DOCUMENTS

| | | | |
|---|---|---|---|
| 5,883,028 A * | 3/1999 | Morman | .............. A41D 31/145 442/394 |
| 5,900,471 A | 5/1999 | Glans | |
| 7,592,055 B2 | 9/2009 | Takeda et al. | |
| 2002/0049018 A1 | 4/2002 | Shimano et al. | |

FOREIGN PATENT DOCUMENTS

| | | |
|---|---|---|
| CN | 101725048 A | 6/2010 |
| CN | 104647843 A | 5/2015 |
| EP | 1591471 A1 | 11/2005 |
| JP | S57005424 | 6/1980 |
| JP | 2011037101 | 2/2011 |

* cited by examiner

COMPOSITE TEXTILE PRODUCT

CROSS REFERENCE TO RELATED APPLICATIONS

This application is a Continuation-In-Part (CIP) of an earlier filed, pending, application, having application Ser. No. 16/004,899 and filed on Jun. 11, 2018, which claims priority under 35 U.S.C. § 119(a) on Patent Application No(s). 106134238 filed in Taiwan, Republic of China on Oct. 3, 2017, the entire contents of which are hereby incorporated by reference.

BACKGROUND

Technology Field

This disclosure relates to a textile product and, in particular, to a composite textile product having good water-vapor permeability and water-proof property and comforting environmental protection and economic benefits.

Description of Related Art

As the progress of technology, the textile materials have been developed from the simple knitted fabrics and woven fabrics to the functional fabrics and environmentally friendly fibers, and these developments create the transformation of the traditional textile industry. With the rapid development of high-tech research and development, the improvement of quality and versatility of textile products has become an important issue for technical personnel in this art while developing textile products.

The water-vapor transmission is the process of transferring moisture (including a gaseous water (e.g., moisture) or liquid water (e.g., sweat)) from the skin to the outer garment surface and allowing it to evaporate. Therefore, the water-vapor transmission is an important factor in maximizing wearer comfort during physical activity. "Water-vapor permeability" refers to the ability of evaporating the vapor released by the body during exercise through the film pores in the fabric to the outside environment, thereby achieving a cooling effect. A good water-vapor permeability can maintain the excellent comfort and dryness.

In addition, "water-proof" ability refers to the ability of a fabric to withstand the penetration of moisture from the external environment into the internal environment (e.g., skin). The surface of this fabric is usually coated with polyurethane (PU), thermoplastic polyurethane (TPU), polytetrafluoroethylene (PTFE), or the likes, or the fabric is manufactured by laminating soft films. However, the thermoplastic polyurethane (TPU) will deteriorate over time, and its interface strength with different nylon fabrics is insufficient. Besides, the key raw materials thereof are imported from other countries, so this conventional fabric cannot meet domestic requirements for producing high-order functional films.

In addition, the conventional textile materials (such as PU, TPU, and PTFE) that have water-vapor permeability and water-proof ability cannot be recycled, which is inconsistent with environmental protection and economic efficiency. For example, TPU has a water repellent treatment by perfluorinated compounds (PFCs), which are harmful to the environment and human body. On the other hand, those skilled in the art have also encountered bottlenecks in the development of textile products that promote water-vapor permeability and waterproof ability. Therefore, it is desired to develop a composite textile product that has excellent water-vapor permeability and waterproof ability and meets environmental protection and economic benefits.

SUMMARY

An objective of this disclosure is to provide a composite textile product that has excellent water-vapor permeability and waterproof ability and is recyclable for meeting environmental protection and economic benefits.

This disclosure provides a composite textile product, comprising a polyamide textile layer and a polyamide film bonded to the polyamide textile layer. A thickness of the polyamide textile layer is between 0.1 mm and 0.3 mm. The polyamide film has an average pore size ranging from 10 μm to 150 μm. A thickness of the polyamide film is between 0.01 mm and 0.1 mm. The polyamide film comprises a copolymer material, and the copolymer material comprises a polyamide section and a polyether section, the polyamide section has a formula (II) and the polyether section has a formula (III) as follow:

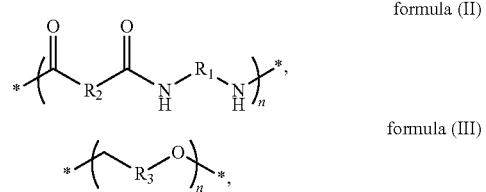

wherein, each of $R_1$, $R_2$ and $R_3$ is independently hydrocarbyl, and n is a positive integer.

In one embodiment, a porosity of the polyamide film is between 10% and 20%.

In one embodiment, the copolymer material has a formula (I) as follow:

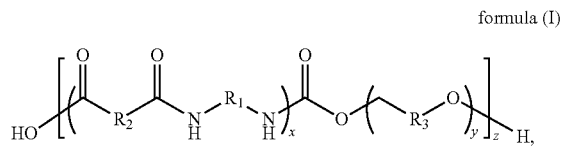

wherein, each of $R_1$, $R_2$ and $R_3$ is independently hydrocarbyl, and each of x, y and z is independently a positive integer.

In one embodiment, the hydrocarbyl is selected from a group composed of saturated or unsaturated C1~C20 straight chain hydrocarbyl, and saturated or unsaturated C1~C20 branched chain hydrocarbyl.

In one embodiment, the hydrocarbyl is selected from a group composed of saturated or unsaturated C1~C6 straight chain hydrocarbyl, and saturated or unsaturated C1~C6 branched chain hydrocarbyl.

In one embodiment, a water-vapor transmission rate of the composite textile product is between 4,000 g/m²/24 hrs and 10,000 g/m²/24 hrs.

In one embodiment, a water-vapor transmission rate of the polyamide film is between 6,000 g/m²/24 hrs and 120,000 g/m²/24 hrs.

In one embodiment, a hydrostatic head value of the composite textile product is between 30,000 mmH₂O and 32,000 mmH₂O.

In one embodiment, the polyamide film is bonded to the polyamide textile layer by polyurethane reactive hot melt adhesives (PUR).

In one embodiment, the polyamide film is an electrospinning polyamide film.

In one embodiment, the composite textile product further comprises a textile layer.

In one embodiment, the textile layer is disposed at one side of the polyamide film away from the polyamide textile layer.

In one embodiment, the textile layer is disposed at one side of the polyamide textile layer away from the polyamide film.

As mentioned above, in the composite textile product of this disclosure, the first fluid containing water molecules (e.g. gaseous water) can penetrate through the polyamide film and the polyamide textile layer and then be transmitted to the outer environment, and the second fluid containing water molecules (e.g. liquid water) cannot penetrate through the polyamide textile layer and the polyamide film and cannot reach the inner environment. Accordingly, the composite textile product of this disclosure has good water-vapor permeability and water-proof property. In addition, the composite textile product of this disclosure is made of recyclable polyamide material, so this product can comfort environmental protection and economic benefits.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
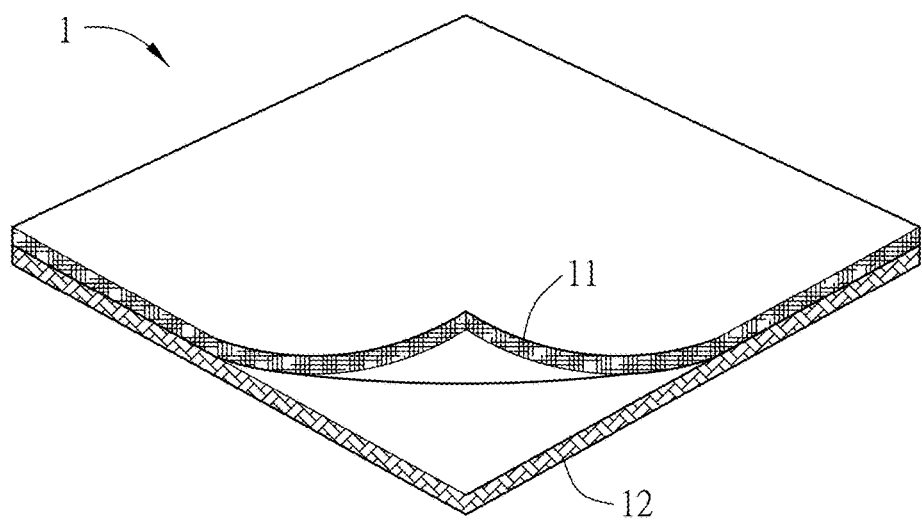
FIG. 1A is a schematic diagram showing a composite textile product according to a first embodiment of this disclosure.

FIG. 1A is a schematic diagram showing a composite textile product according to a first embodiment of this disclosure. As shown in FIG. 1A, the composite textile product 1 includes a polyamide textile layer 11 and a polyamide film 12. The polyamide film 12 is bonded to the polyamide textile layer 11. The polyamide film 12 has a plurality of micro holes, and an average pore size of the micro holes ranges from 10 μm to 150 μm.

In this embodiment, a thickness of the polyamide textile layer 11 is between 0.1 mm and 0.3 mm. For example, the thickness of the polyamide textile layer 11 can be 0.15 mm, 0.2 mm, 0.22 mm, or 0.25 mm. The porosity of the polyamide film 12 is between 10% and 20%. In particular, the polyamide textile layer 11 can be any product made of nylon fibers. In this embodiment, the thickness of the polyamide film 12 is between 0.01 mm and 0.1 mm. For example, the thickness of the polyamide film can be 0.02 mm, 0.04 mm, 0.06 mm, or 0.08 mm. The polyamide textile layer 11 and the polyamide film 12 can be bonded by polyurethane reactive hot melt adhesives (PUR), and this disclosure is not limited.

Figure 1B:
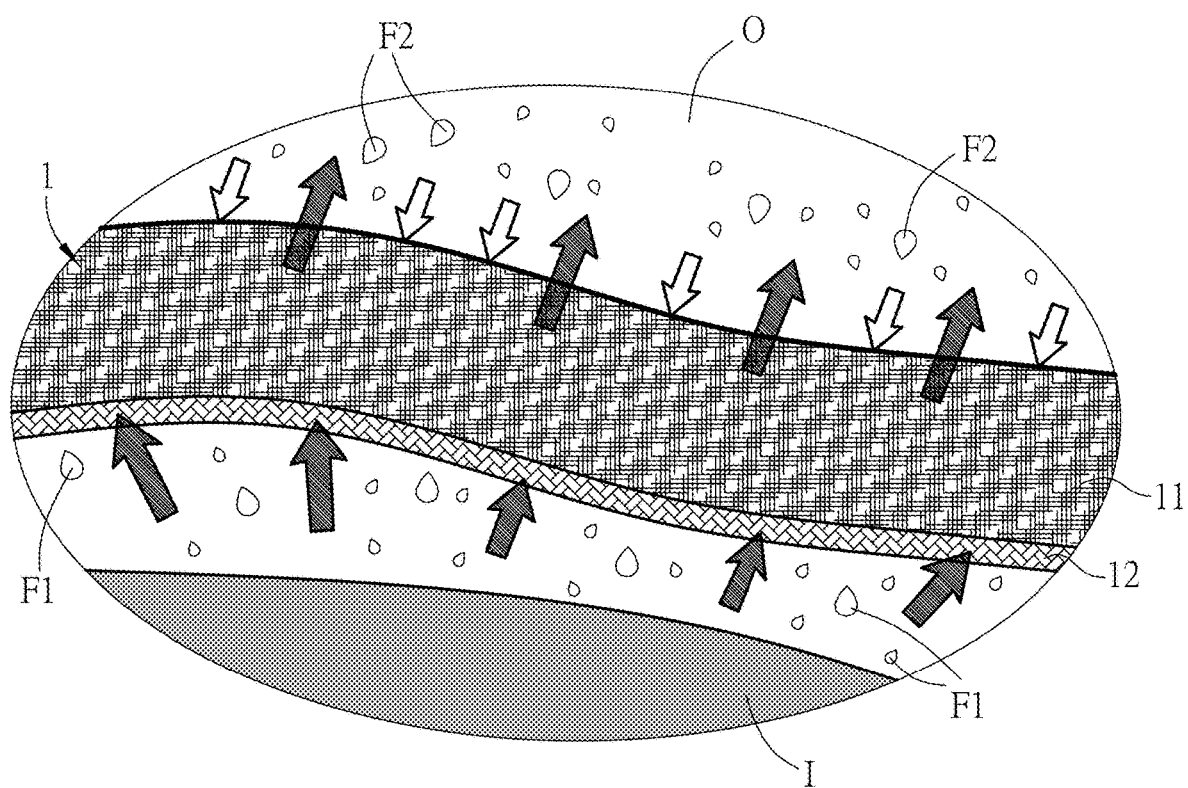
FIG. 1B is a schematic diagram showing the composite textile product of FIG. 1A in use.

FIG. 1B is a schematic diagram showing the composite textile product of FIG. 1A in use. As shown in FIG. 1B, if the composite textile product 1 is applied to the clothes for human, when a user wears the composite textile product 1, the polyamide film 12 is closer to the skin of the user. In other words, the polyamide textile layer 11 is away from the skin of the user and is closer to the outer space when the user wears the composite textile product 1. In this case, the outer space outside the polyamide textile layer 11 is defined as an outer environment O, and the space between the polyamide film 12 and the skin of the user is defined as an inner environment I.

The composite textile product 1 of this embodiment has a water-vapor permeable effect. In general, the human body usually sweats and generates water vapor (containing water molecules). If the user wears the clothes made of the composite textile product 1, the inner environment I between the polyamide film 12 and the skin of the user will have a higher humidity than the outer environment O. Accordingly, a moisture pressure difference between inner environment I and the outer environment O, which are located at two sides of the composite textile product 1 (the clothes) can be generated. Accordingly, the water molecules of the water vapor (the first fluid F1 containing water molecules) will flow from the inner environment I with higher humidity to the outer environment O. In more detailed, the water molecules can pass through the micro holes of the polyamide film 12 and migrate along the gray arrows of the figure. As a result, the water molecules can penetrate through the polyamide film 12 and the polyamide textile layer 11 and move from the inner environment I to the outer environment O. In addition, the polyamide film 12 of this embodiment also has hydrophilicity, so that it can absorb the water molecules and diffuse the water molecules to the polyamide textile layer 11. Then, the water molecules can be evaporated to the outer environment O so as to finish desorption.

In addition, the composite textile product 1 of this embodiment also has a water-proof effect. For example, when the outer environment O contains liquid water from rain or snow (the second fluid F2 containing water molecules), the liquid water cannot pass through the micro holes of the polyamide film 12 along the white arrows. Thus, the liquid water in the outer environment O cannot reach the inner environment I. As a result, the composite textile product 1 can provide a water-proof effect.

Moreover, since the composite textile product 1 of this embodiment is made of polyamide material, it can be recycled by physical or chemical method. In more detailed, the recycled polyamide material can be formed into polyamide plastic particles, which can be easily used in the manufacturing processes such as wire drawing process or ejection process. The recyclable property of the composite textile product 1 can reduce the generation of waste and thus be benefit to the environmental protection.

Figure 1C:
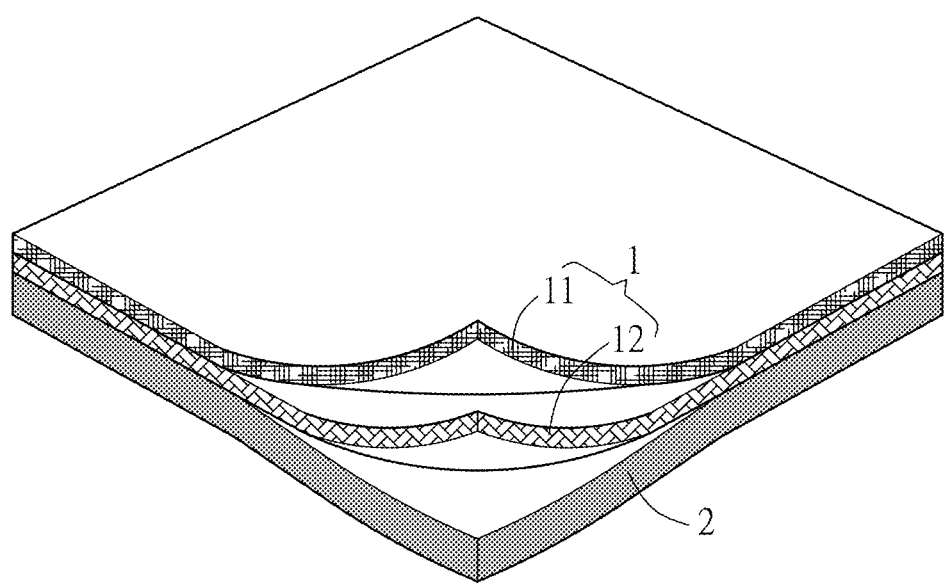
FIG. 1C is a schematic diagram showing another aspect of the composite textile product of FIG. 1A.

Referring to FIG. 1C, in another aspect, the composite textile product 1 of this embodiment can also be cooperated with the textile layer 2 having another function (e.g. windproof or warm) according to the requirements of the user or the manufacturer. As shown in FIG. 1C, the additional textile layer 2 can be disposed at one side of the polyamide film 12 away from the polyamide textile layer 11 (close to the inner environment I). Alternatively, the additional textile layer 2 can be disposed at one side of the polyamide textile layer 11 away from the polyamide film 12 (close to the outer environment O). In this embodiment, the material of the textile layer 2 may include other than polyamide material and can be optionally selected based on the actual requirement. This disclosure is not limited. In addition, the composite textile product 1 and the textile layer 2 can be configured by gluing, sewing or fusing. Any approach that can substantially remain the waterproof ability and moisture permeability of the final product can be used to fabricate the composite textile product 1, and this disclosure is not limited.

Figure 2:
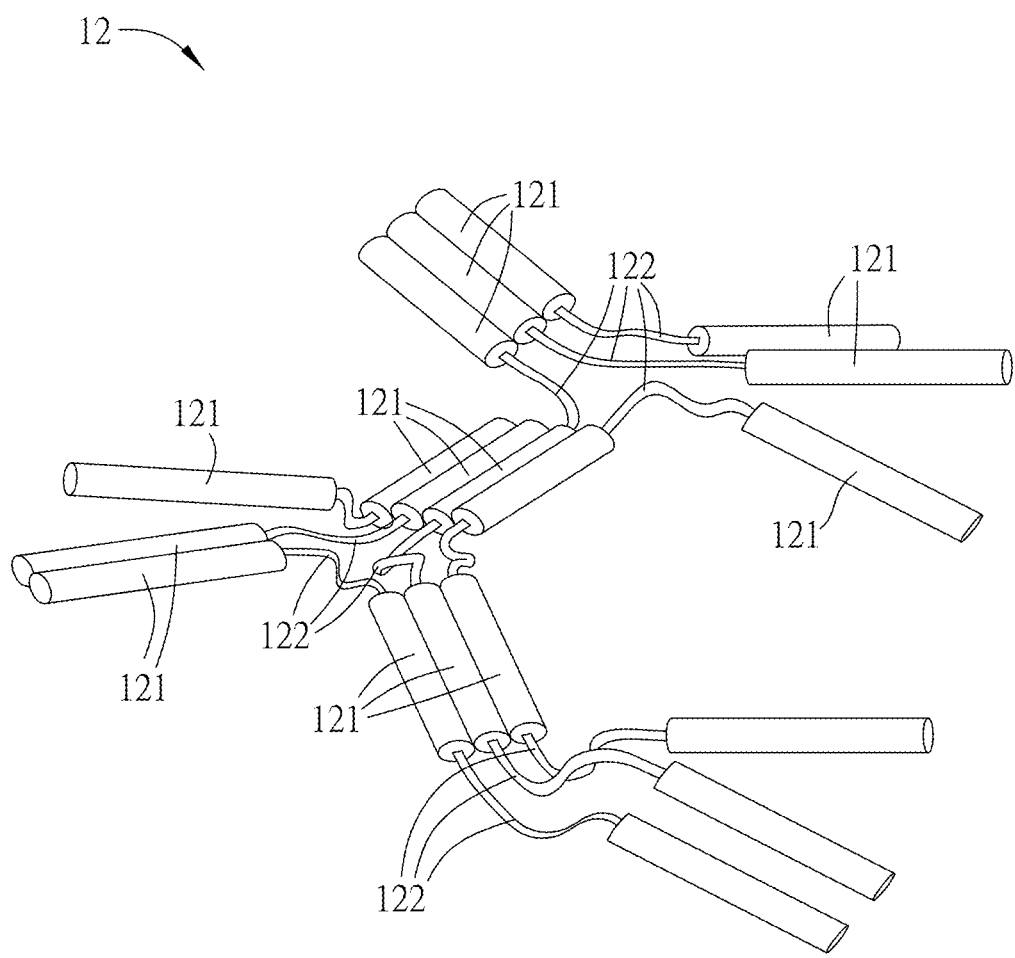
FIG. 2 is a schematic diagram showing the polyamide film of the composite textile product of FIG. 1A.

In this embodiment, the hydrophilicity of the polyamide film 12 is provided by the copolymer material contained in the polyamide film 12. As shown in FIG. 2, the copolymer material is nylon elastic member containing a polyamide section 121 and a polyether section 122. In practice, the copolymer material contains the polyether block amide (PEBA) compound prepared by the polymerization of polyamide and polyether. The polyamide section 121 has higher rigidity (higher hardness), so it has good wear resistance, chemical resistance, and high temperature resistance. In addition, the polyether section 122 has lower rigidity (lower hardness), so it has good water-vapor permeability, elastic recovery rate, and bending fatigue resistance. Accordingly, the polyamide film 12, which is made by the polymerization of polyamide and polyether and the film extrusion process, can have a good elasticity. In addition, the polyamide film 12 also could be made by electrospinning, coating, or other film forming process in the art. Moreover, since the polyamide film 12 contains the structure of polyamide section 121, it can have a good wear resistance better than the conventional TPU film. As a result, the composite textile product 1 containing the polyamide film 12 can satisfy the requirements of wear resistance, water-vapor permeability, waterproof, and bending fatigue resistance for the outdoor sport product. To be noted, the above-mentioned polymerization and film extrusion process are the known knowledge for the skilled person in the art, so the detailed descriptions thereof will be omitted.

The copolymer material of the polyamide film 12 has a formula (I) as follow:

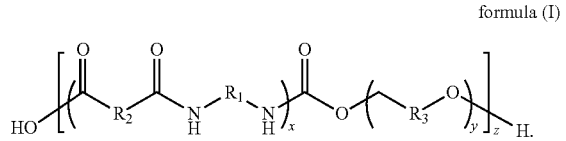

formula (I)

In the above formula (I), each of $R_1$, $R_2$ and $R_3$ is independently hydrocarbyl (e.g. alkyl, alkenyl, or cycloalkyl), and each of x, y and z is independently a positive integer. For example, the hydrocarbyl is selected from a group composed of saturated C1~C20 straight chain hydrocarbyl (for example but not limited to methyl, ethyl, n-propyl, n-butyl, n-pentanyl, n-hexanyl, n-heptyl, n-octyl, n-decyl, n-sulfanyl, n-undecyl, n-dodecyl, n-tridecyl, n-tetradecyl, n-pentadecyl, n-hexadecyl, n-heptadebyl, n-octadecyl, n-nonadecyl, or n-eicosyl), unsaturated C2~C20 straight chain hydrocarbyl (for example but not limited to vinyl, propenyl, propynyl, butenyl, butynyl, pentenyl, pentynyl, hexenyl, hexynyl, heptenyl, heptynyl, octenyl, octynyl, C9~C20 straight chain alkenyl, or C9~C20 straight chain alkynyl), saturated C3~C20 branched chain hydrocarbyl (for example but not limited to isopropyl, 1-methyl-1-propane, 2-methyl-1-propane, t-butyl, or C5~C20 branched alkyl), or unsaturated C1~C20 branched chain hydrocarbyl (for example but not limited to isopropenyl, 1-methyl-1-propenyl, 2-methyl-1-propenyl, 1-methyl-2-propenyl, 2-methyl-2-propenyl, C5~C20 branched chain alkenyl, or C5~C20 branched chain alkynyl).

As mentioned above, in this embodiment, the copolymer material is prepared by the polymerization of polyamide and polyether. In this embodiment, the polyamide (PA) can be, for example but not limited to, PA6, PA11, PA12, PA46, PA66, PA610, or PA612, and the polyether can be polyether resin. The polyamide and polyether can have the following formulas (II) and (III):

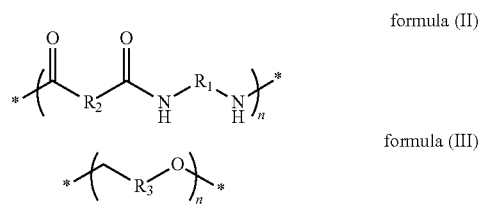

formula (II)

formula (III)

Wherein, each of $R_1$, $R_2$ and $R_3$ is independently hydrocarbyl (e.g. alkyl, alkenyl, or cycloalkyl), and n is a positive integer. The selection and modification of $R_1$, $R_2$ and $R_3$ can be referred to the above formula (I), so the detailed descriptions thereof will be omitted.

For example, the formula (II) can be

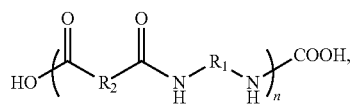

and the formula (III) can be

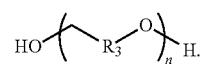

Taking these two structure as raw materials, a series of thermoplastic elastomers of formula (I) polyether block amide (PEBA) copolymers were synthesized by melt polycondensation in the autoclave.

The experimental examples of the composite textile product 1 of this embodiment will be described hereinafter. To be noted, the following description is used to describe the present disclosure in detail so those skilled in the art can realize it, but is not intended to limit the scope of the present disclosure.

Experimental Example 1: Tests for Water-Vapor Permeability and Waterproof Ability of the Composite Textile Product In the experimental example, the composite textile product is tested to realize the water-vapor permeability and waterproof ability thereof, and the polyamide film is tested to realize the water-vapor permeability thereof. In particular, the standard for measuring the water-vapor permeability is different in different countries. For example, the measurement standard in USA is ASTM E96 (g/m$^2$*24 hr), which has a measurement condition for dry continental climate, so that the measurement result can realize the water-vapor transmission ability in sunny day. The measurement standard in Japan is JIS L 1099 (g/m$^2$*24 hr), which has a measurement condition for humid island climate, so that the measurement result can realize the water-vapor transmission ability in cloudy-rainy day. These two measurement standards are all applied in this experimental example. The water-vapor permeability is evaluated by water-vapor permeability test, and the waterproof ability is evaluated by hydrostatic head test. The tests of the water-vapor permeability and waterproof ability of the composite textile product is assigned to Intertek Testing Services Taiwan Ltd. The test samples include the polyamide textile layer (sample No. WR-WNR0007) and polyamide film (sample No. EVO-20) (Mw: 40,000~100,000 g/mole). The sample is a lamination sample made of a copolymer containing polyamide having the formula (II), wherein each of $R_1$ and $R_2$ is independently C1~C6 hydrocarbyl, and polyether having the formula (III), wherein R is C1~C6 hydrocarbyl. The polyamide textile layer contains 100% of polyamide (134 piece/inch*70 piece/inch, 70 denier*160 denier). First, the polyamide textile layer is subjected to a water repellent treatment, and then the polyamine textile layer is bonded to the polyamide film by a lamination manner. The water-vapor permeability is evaluated based on ASTM E96 BW 2015 (inverted cup method) (test temperature: 23° C., relative humidity: 50%±3%, wind speed: 0.1~0.2/sec). The test sample is locked on a round cup and inverted on a round turntable in the tester (membrane surface contacts with water). After placing the test sample and waiting for one hour, the round cup is retrieved out and the weight of the water in the round cup is tested. Then, the data is calculated as the water-vapor permeability index. In addition, The water-vapor permeability is also evaluated based on JIS L 1099-2012 B1 (potassium acetate inverted test) (test temperature: 23° C., relative humidity: 30%±3%). The potassium acetate solution is putted into the test cup to ⅔ volume, and then a Teflon film is provided and fixed on the cup. The test sample is locked on the round cup, water is placed in the cup, and the water contacts the membrane surface. Then, the sample cup is putted into the potassium acetate sample (the surface of the polyamide textile layer 12 is in contact with the Teflon film). After 15 minutes, the weight of potassium acetate is measured, and the calculated data is used as the water-vapor permeability index.

The hydrostatic head test can be referred to the method B, chapter 7.1.2, JIS L 1092-2009. In detailed, the test sample is locked in the test disc on the tester. The surface of the polyamide film faces upward, and the surface of the polyamide textile layer contacts water. The water is poured into the disc at a fixed speed. This is to test the tolerable pressure (water pressure) thereof, which can be served as a waterproof index. This experiment is repeated 5 times (hydrostatic head values are 31,990 mmH$_2$O, 31,520 mmH$_2$O, 31,760 mmH$_2$O, 31,260 mmH$_2$O, and 31,570 mmH$_2$O), and the average value thereof is calculated. The test results of composite textile product are shown in Table 1.

TABLE 1

| Water-vapor permeability (ASTM E96 BW 2015) | Water-vapor permeability (JIS L 1099-2012 B1) | Average hydrostatic head value |
|---|---|---|
| 4,130 g/m$^2$/24 hrs | 9,650 g/m$^2$/24 hrs | 31,620 mmH$_2$O |

In addition, the water-vapor permeability test of the polyamide film can be performed based on the above-mentioned ASTM E96 BW 2015 or JIS L 1099-2012 B1. The test results indicate that the water-vapor permeability of a single polyamide film is between 6,000 g/m$^2$/24 hrs and 120,000 g/m$^2$/24 hrs.

The experiment results indicate that the composite textile product of this disclosure has good water-vapor permeability and water-proof property.

Figure 3:
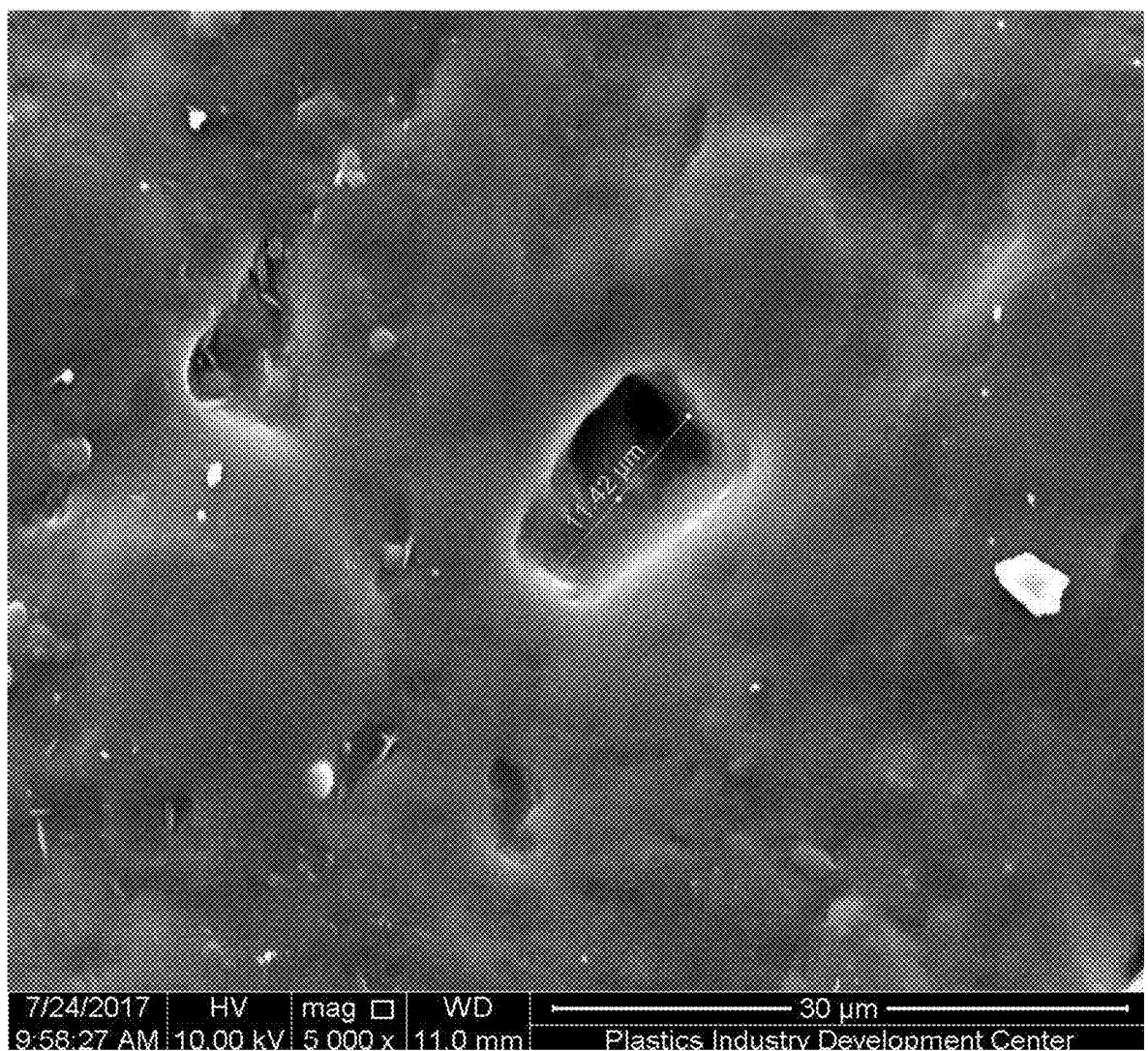
FIG. 3 is a schematic diagram showing an electronic microscope photo of the polyamide film of the composite textile product of this disclosure.
Figure 4:
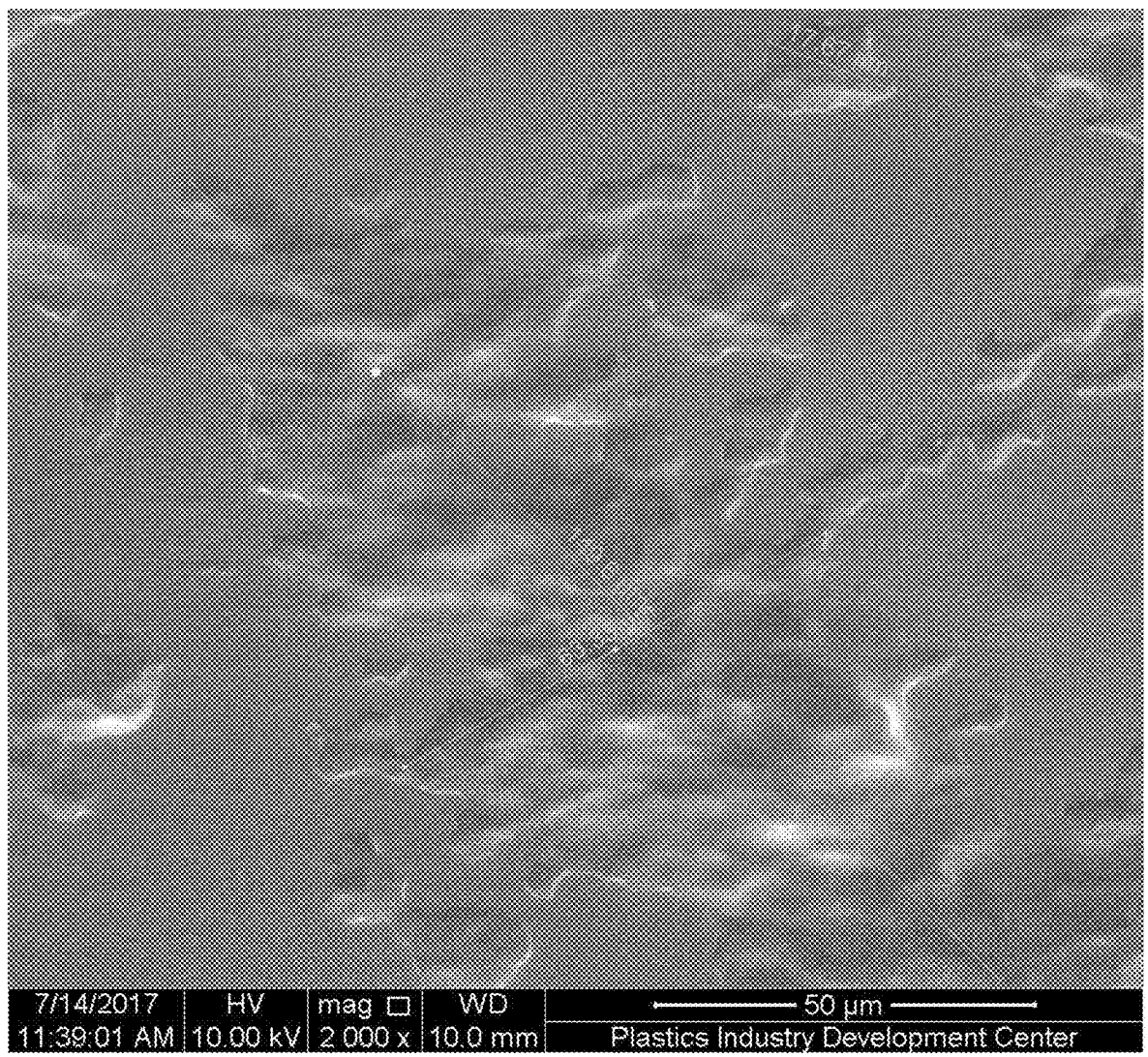
FIG. 4 is a schematic diagram showing another electronic microscope photo of the polyamide film of the composite textile product of this disclosure.

Experimental Example 2: Electronic Microscope Observation of Composite Textile Product In this experimental example, the polyamide film of the composite textile product of this embodiment is provided and observed under the electronic microscope so as to realize the pore size of the polyamide film. This experiment is assigned to Plastics Industry Development Center (Taiwan). The electronic microscope observation results are shown in FIGS. 3 and 4. Referring to FIGS. 3 and 4, the pore size of the polyamide film ranges from 11.42 μm to 149.6 μm. Accordingly, the polyamide film can block the passage of liquid water molecules, but allow the passage of gaseous water molecules (water vapor).

In summary, the composite textile product of this disclosure has a polyamide textile layer and a polyamide film, so that the first fluid containing water molecules (gaseous water) can penetrate through the polyamide film and the polyamide textile layer and then be transmitted to the outer environment, and the second fluid containing water molecules (liquid water (e.g. rain or snow water)) cannot penetrate through the polyamide textile layer and the polyamide film and cannot reach the inner environment. Accordingly, the composite textile product of this disclosure has good water-vapor permeability and water-proof property. In addition, the composite textile product of this disclosure is made of recyclable polyamide material, so this product can comfort environmental protection and economic benefits.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A composite textile product, comprising:
    a polyamide textile layer, a thickness of the polyamide textile layer is between 0.1 mm and 0.3 mm; and
    a polyamide film bonded to the polyamide textile layer, wherein the polyamide film has an average pore size ranging from 10 μm to 150 μm, a thickness of the polyamide film is between 0.01 mm and 0.1 mm;
    wherein the polyamide film comprises a copolymer material, and the copolymer material has a formula (I) as follow:

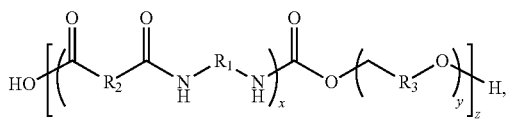

formula (I)

wherein, each of $R_1$, $R_2$ and $R_3$ is independently hydrocarbyl, and each of x, y and z is a positive integer.

2. The composite textile product according to claim 1, wherein a porosity of the polyamide film is between 10% and 20%.

3. The composite textile product according to claim 1, wherein the hydrocarbyl is selected from a group composed of saturated or unsaturated C1~C20 straight chain hydrocarbyl, and saturated or unsaturated C1~C20 branched chain hydrocarbyl.

4. The composite textile product according to claim 3, wherein the hydrocarbyl is selected from a group composed of saturated or unsaturated C1~C6 straight chain hydrocarbyl, and saturated or unsaturated C1~C6 branched chain hydrocarbyl.

5. The composite textile product according to claim 1, wherein a water-vapor transmission rate of the composite textile product is between 4,000 $g/m^2/24$ hrs and 10,000 $g/m^2/24$ hrs.

6. The composite textile product according to claim 1, wherein a water-vapor transmission rate of the polyamide film is between 6,000 $g/m^2/24$ hrs and 120,000 $g/m^2/24$ hrs.

7. The composite textile product according to claim 1, wherein a hydrostatic head value of the composite textile product is between 30,000 $mmH_2O$ and 32,000 $mmH_2O$.

8. The composite textile product according to claim 1, wherein the polyamide film is bonded to the polyamide textile layer by polyurethane reactive hot melt adhesives (PUR).

9. The composite textile product according to claim 1, wherein the polyamide film is an electrospinning polyamide film.

10. The composite textile product according to claim 1, further comprises a textile layer.

11. The composite textile product according to claim 10, the textile layer is disposed at one side of the polyamide film away from the polyamide textile layer.

12. The composite textile product according to claim 10, the textile layer is disposed at one side of the polyamide textile layer away from the polyamide film.

* * * * *